US010598806B2

(12) United States Patent
Davison et al.

(10) Patent No.: US 10,598,806 B2
(45) Date of Patent: Mar. 24, 2020

(54) ESTIMATING A TIME VARIANT SIGNAL REPRESENTING A SEISMIC SOURCE

(71) Applicant: CGG SERVICES SAS, Massy (FR)

(72) Inventors: Chris Davison, Crawley (GB); Gordon Poole, East Grinstead (GB); Ziqin Yu, Massy (FR); Yuan Ni, Paris (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 16/419,342

(22) Filed: May 22, 2019

(65) Prior Publication Data

US 2019/0271789 A1  Sep. 5, 2019

Related U.S. Application Data

(62) Division of application No. 15/527,122, filed as application No. PCT/IB2015/002374 on Nov. 24, 2015, now Pat. No. 10,345,472.

(60) Provisional application No. 62/189,781, filed on Jul. 8, 2015, provisional application No. 62/171,417, filed on Jun. 5, 2015, provisional application No. 62/084,295, filed on Nov. 25, 2014.

(51) Int. Cl.
G01V 1/36 (2006.01)
G01V 1/38 (2006.01)

(52) U.S. Cl.
CPC .............. G01V 1/366 (2013.01); G01V 1/38 (2013.01); G01V 2210/3246 (2013.01); G01V 2210/56 (2013.01)

(58) Field of Classification Search
CPC .. G01V 1/366; G01V 1/38; G01V 2210/3246; G01V 2210/56

USPC ...................................................... 367/24, 21
See application file for complete search history.

(56) References Cited

U.S. PATENT DOCUMENTS

| 4,476,550 A | 10/1984 | Ziolkowski et al. |
| 4,476,553 A | 10/1984 | Ziolkowski et al. |
| 4,718,045 A | 1/1988 | Desler |
| 4,868,794 A | 9/1989 | Ziolkowski et al. |
| 9,513,392 B2 * | 12/2016 | Hegna ...................... G01V 1/38 |
| 2004/0022125 A1 | 2/2004 | Clayton et al. |

(Continued)

FOREIGN PATENT DOCUMENTS

| GB | 2323669 B | 9/1999 |
| WO | 2013137974 A1 | 9/2013 |
| WO | 2015044207 A1 | 4/2015 |

OTHER PUBLICATIONS

A. Ziolkowski et al., "The signature of an air gun array: Computation from near-field measurements including interactions", Geophysics, Oct. 1982, pp. 1413-1421, vol. 47, No. 10.

(Continued)

Primary Examiner — Daniel L Murphy
(74) Attorney, Agent, or Firm — Patent Portfolio Builders PLLC

(57) ABSTRACT

A method for estimating a time variant signal representing a seismic source obtains seismic data recorded by at least one receiver and generated by the seismic source, the recorded seismic data comprising direct arrivals and derives the time variant signal using an operator that relates the time variant signal to the acquired seismic data, the operator constrained such that the time variant signal is sparse in time.

12 Claims, 9 Drawing Sheets

(56) References Cited

U.S. PATENT DOCUMENTS

2013/0258808 A1 10/2013 Niang et al.
2014/0039799 A1 2/2014 Krohn

OTHER PUBLICATIONS

Adelson Santos De Oliveira, "Seismic pulses obtained from the analysis of direct waves: A comparison to simulated pulses obtained with modeled notionals", The Leading Edge, Jan. 2000, pp. 68-71.
Amundsen, "Linear inversion for source signatures from ministreamer data", The Leading Edge, Jan. 2000, pp. 40-43.
Chris Davison et al, "Far-field source signature reconstruction using direct arrival data", 77th EAGE Conference & Exhibition, Jan. 1-4, 2015, Madrid, Spain.
Final Office Action, dated Nov. 7, 2018, from corresponding/related U.S. Appl. No. 15/527,122.
G. Poole et al., "Nearfield Hydrophone Driven 3D Source Designature and Deghosting for Multi-Level Source Data", EAGE Workshop on Broadband Seismic—A Broader View for the Middle East, Nov. 16-17, 2015, Abu Dhabi, United Arab Emirates.
G.E. Parkes et al., "The signature of an air gun array: Computation from near-field measurements including interactions—Practical considerations", Geophysics, Feb. 1984, pp. 105-111, vol. 48, No. 2.
International Search Report and Written Opinion, dated Jun. 16, 2016, from corresponding/related PCT Application No. PCT/IB2015/002374.
Office Action, dated Apr. 18, 2018, from corresponding/related U.S. Appl. No. 15/527,122.
Ru-Shan Wu et al., "Seismic envelope inversion and modulation signal model", Geophysics, May-Jun. 2014, pp. WA13-WA24, vol. 79, No. 3.
S. Vaage et al., "Signatures From Single Airguns", Geophysical Prospecting, 1983, pp. 87-97, vol. 31.
Yuan Ni et al., "Joint inversion of near-field and far-field hydrophone data for source signature estimation", SEG Denver 2014 Annual Meeting, Oct. 26-31, 2014, pp. 57-61.
Trad, D., et al.; "Latest views of the sparse Radon transform"; Geophysics, vol. 68, No. 1, Feb. 2003; pp. 386-399.

\* cited by examiner

Direct arrival modelled using spikes    Residual of direct arrival in seismic data minus modelled direct arrival

ESTIMATING A TIME VARIANT SIGNAL REPRESENTING A SEISMIC SOURCE

CROSS REFERENCE TO RELATED APPLICATIONS

This application is a continuation of U.S. patent application Ser. No. 15/527,122, filed May 16, 2017, which is a National Stage of PCT Application No. PCT/IB2015/002374, filed Nov. 24, 2015, which is related to, and claims priority and benefit from U.S. Provisional Patent Application Nos. 62/084,295, filed Nov. 25, 2014, for "Derivation of Source Signatures and Far-Fields from Seismic Data", 62/171,417, filed Jun. 5, 2015, for "Far-Field Source Signature Reconstruction Using Direct Arrival" and 62/189,781, filed Jul. 8, 2015, for "Use Air-Gun Pressure Field Monitoring Data to De-Blend Direct Arrival Energy to Seismic Reflection", the entire contents of which are incorporated herein by reference.

TECHNICAL FIELD

Embodiments of the subject matter disclosed herein generally relate to methods and systems for imaging and characterizing a subsurface.

BACKGROUND

An accurate description of a seismic source signature is required in order to carry out a number of functions in seismic data processing. For example, source de-signature, deghosting, zero-phasing or de-bubbling, may be carried out using far-fields derived for a seismic source, which may be one-dimensional (1D), two-dimensional (2D) or three-dimensional (3D). This may require generating far-field signatures in the vertical direction or at a plurality of different take-off angles and azimuths. Seismic sources in marine surveys include arrays of individual or clustered air guns mounted on several parallel strings. Modelling of these seismic sources generates far-field signatures using, for example modelling packages such as Nucleus and Gundalf. These packages use source array geometry and gun characteristics to generate the far-field behaviour using physical modelling of air-guns and super-position of the resulting signatures, including air-gun interaction. These packages, however, are not able to reproduce the low frequency behaviour of the source arrays reliably.

Ziolkowski in Ziolkowski et al., "The signature of an Air Gun Array: Computation from Near Field Measurements Including Interactions", Geophysics, Vol. 47, No. 10, pp. 1413-1421 (October 1982) and Parkes et al., "The Signature of an Air Gun Array: Computation from Near-Field Measurements Including Interactions—Practical Considerations, Geophysics, Vol. 48, No. 2, pp. 105-111 (February 1984) proposed the inversion of data obtained from near-field hydrophone (NFH) sensors mounted on the source array in the vicinity of the seismic air-guns, i.e., in the near-field, to obtain the source signature characteristics. Key to the methodology is the definition of notional sources as source signatures in the proximity of individual air guns within the seismic source array but taking the interactions between the bubbles that take place when the guns are fired together into account. These notional sources are used to generate the source array signatures as desired.

For legacy surveys, however, NFH recordings may be unavailable, and NFH data on current surveys may be contaminated. The use of contaminated NFH data would result in contaminated far-fields which could be unsatisfactory for their intended purpose. Attempts to overcome unavailable or contaminated data include the direct recording of a far-field from a sensor mounted on a rope and towed below the boat, which is not always practical. Therefore, a need still exists to calculate far-fields for sources when near-field data are unavailable or unreliable.

SUMMARY

Exemplary embodiments are directed to systems and methods that use far field, e.g. streamer, ocean bottom node (OBN) or ocean bottom cable (OBC), seismic data to extract the source wavelet. These systems and method are applied to far-field data in isolation or in combination of near-field data. In one embodiment, far-field data to relate to measurements greater than 10 m from the source, and near-field data related to measurements less than 10 m from the source. For example, the near-field data are obtained from single receivers associated with each one of the sources and located about one meter from the sources.

An embodiment is directed to a method for estimating a time variant signal representing a seismic source. Suitable seismic sources include a source array containing a plurality of seismic sources. Seismic data recorded by at least one receiver and generated by the seismic source are obtained. The recorded seismic data include direct arrivals. In one embodiment, these direct arrivals include a ghost reflection at the air-water interface. The time variant signal is derived using an operator that relates the time variant signal to the acquired seismic data. Suitable time variant signals include a notional source and a farfield signature. The operator is constrained such that the time variant signal is sparse in time. In one embodiment, the time variant signal is corrected to reduce seismic source array effects.

When the seismic course is a plurality of seismic sources, the seismic sources are located at a plurality of positions. The operator is a model of the seismic source array having at least one notional source located at each one of the plurality of positions. In one embodiment, each seismic source is an air gun having a gun volume, and the model of the seismic source array further includes at least one notional source having an amplitude scaled by a factor proportional to a cube root of the gun volume at each one of the plurality of positions.

In one embodiment, the at least one receiver is a receiver array having a plurality of individual receivers. Seismic data are obtained from the receiver array, and the operator comprises a sum of signals from the plurality of individual receivers and a spatial distribution of the individual receivers. In one embodiment, the operator defines a linear problem that is constrained using sparseness weights, and the sparseness weights restrict the time variant signal to a time window. In one embodiment, the sparseness weights are derived based on an estimate of the time variant signal. In one embodiment, the operator is defined so as to describe the obtained seismic data by a series of spikes. In one embodiment, low frequency and high frequency components of the time variant signal are derived separately.

An embodiment, is directed to a method for determining direct arrival energy. Notional source data representing a seismic source, a source position for the seismic source and a receiver position for a seismic receiver that records seismic data generated by the seismic source are obtained. A direct arrival is determined at the receiver position using the source position, the receiver position, and the notional source data. In one embodiment, the seismic receiver is a point receiver or a receiver array containing a plurality of point receivers. The receiver array combines recordings from the plurality of point receivers.

In one embodiment, acquiring the notional source data includes deriving the notional source data from at least one nearfield hydrophone measurement and physical modelling. In one embodiment, the direct arrival determined from notional source data representing a seismic source is subtracted from direct arrival data in the obtained seismic data.

An embodiment is directed to computing system for estimating a time variant signal representing a seismic source. The computing system includes a storage device containing seismic data recorded by at least one receiver and generated by the seismic source. The recorded seismic data include direct arrival. A processor is in communication with the storage device and configured to derive the time variant signal using an operator that relates the time variant signal to the recorded seismic data, wherein the operator is constrained such that the time variant signal is sparse in time. The time variant signal can be a notional source or a farfield signature.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
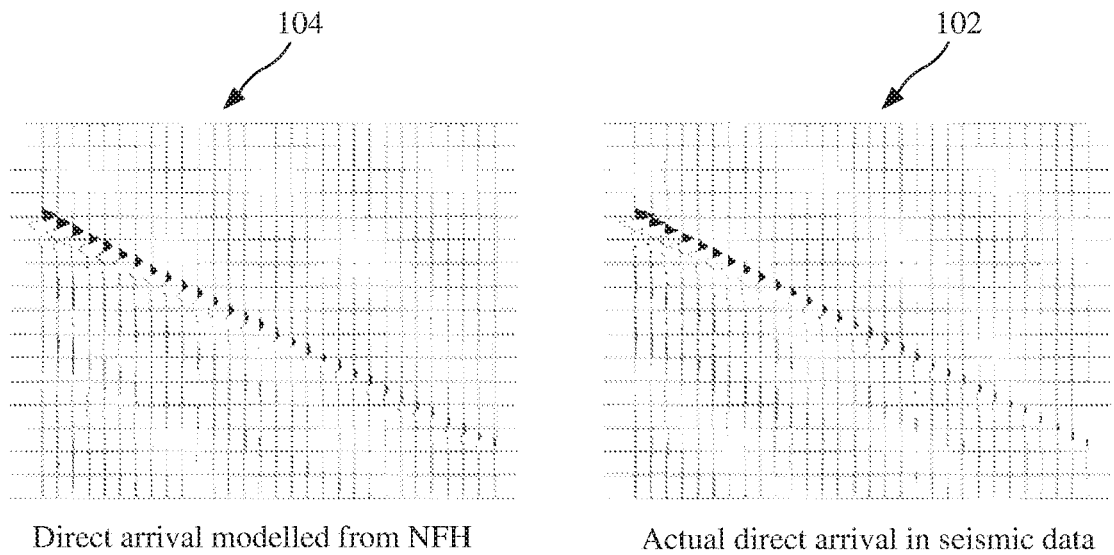
FIG. 1 is a graphical comparison of actual direct arrival to modeled direct arrival.

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Ziolkowski described equations relating the signals at a set of NFH sensors in terms of notional sources. As used herein a notional source, or notional sources, is a hypothetical isotropic source that represents a source element within an array. In the Ziolkowski equations, the pressure measurement at each NFH sensor is a weighted sum of each notional source, shifted in time and weighted by the reciprocal of the distance of that air-gun from the NFH sensor to model spherical spreading, plus the source ghost terms with suitable weights. Given the NFH recordings from a set of sensors, it is possible to invert the equations to find the notional sources, as described by Ziolkowski. Having found the notional sources, the desired far-field signatures at any location may then be derived.

The method of Ziolkowski relies upon near-field data, i.e., NFH sensors. However, exemplary embodiments generate notional sources and far-field signatures from far-field seismic data rather than inverting from near-field data as in Ziolkowski. In one embodiment, far-field data are data recorded at seismic sensors located more than 10 meters from the seismic source. Given recorded seismic data such as a set of seismic records for a marine survey, which can be recorded using pressure sensors on seismic streamers, each trace in the set of seismic records is associated with a given hydrophone channel on the seismic streamer. In one embodiment, the seismic streamers include alternative sensors to pressure sensors, e.g., a multi-component streamer can be used, which may record particle motion, particle velocity, particle acceleration, etc. The set of seismic records or streamer data record both the reflection data from the subsurface and the direct arrivals from the seismic source.

Therefore, an alternative set of equations analogous to those described by Ziolkowski is derived that relates the direct arrival at each channel in the streamer or seismic receiver to one or more notional sources in the source array and their respective ghosts at the water surface. Known quantities that are used in the set of equations are the position of the source array, the distribution of the individual guns in the source array, the position of the streamer and the positions of the individual channels or receivers are also known. Using the alternative set of equations, the distances between each channel or receiver location in the streamer and the individual guns or sources in the source array are calculated. These calculated distances are then used to calculate the time shifts and spherical spreading weighting coefficients in the alternative set of equations. In one embodiment, a single notional source is used to represent the entire source array behaviour and express the channel hydrophone recordings. Alternatively a separate notional source is used for each gun string, air gun, or other representation of the source array. Air guns may be all be placed at a single depth or may be placed at more than one depth. While described for the use of an air gun array, the approach may also be used for other source types, for example marine vibrators, pingers, sparkers, boomers and vaporchoc.

As the equations of Ziolkowski relate the direct arrivals to notional sources, these hydrophone equations of Ziolkowski can be used to model the direct arrivals using NFH data for the source array. Referring to FIG. 1, the recorded direct arrival in the streamer seismic data 102 is illustrated next to the direct arrival estimated using notional sources derived from the NFH data 104. As illustrated, strong agreement is achieved between the actual direct arrival and the modeled direct arrival, indicating that the set of equations used yields an acceptable model of direct arrivals.

Exemplary embodiments use recorded seismic streamer data, and in particular the direct arrivals in the recorded seismic streamer data in the set of equations and solve the set of equations to obtain the notional source or notional sources. Suitable methods for solving the set of equations representing the direct arrivals in terms of the notional sources include, but are not limited to, using an inversion process. As the equations are linear equations, the inversion is a linear inversion. In one embodiment, the traces, i.e., the seismic receiver or hydrophone signals, are represented in equation form using a linear operator applied to the notional source signatures. Each linear operator contains the time shifts together with the factors representing spherical spreading. Both primary, i.e., direct arrival, and ghost terms are encapsulated. The linear operators may be applied in the time or frequency domain. The adjoint linear operator is similarly written down, given the forward model. The linear system is solved in a least squares sense, for example by using a conjugate gradient method. In one embodiment, direct arrival data from one or more cables in the streamers or from one or more shots in the marine seismic survey are also inverted to the notional sources to increase the stability and accuracy of the method.

In one embodiment, the set of equations is solved to find a single notional source representing the array of sources. Alternatively, the set of sources is solved to find a plurality or set of notional sources. If a single notional source is derived, a correction is applied for the source array effect as described herein.

An example of an equation representing the direct arrival is as follows:

$$h_j(t) = \sum_{i=1}^{n} \frac{1}{r_{ij}} n_i\left(t - \frac{r_{ij}}{V_w}\right) + R \sum_{i=1}^{n} \frac{1}{r_{ij}^g} n_i\left(t - \frac{r_{ij}^g}{V_w}\right) \quad (1)$$

In equation (1), t is time, and $h_j$ is the hydrophone, i.e., seismic receiver, signal for channel j. The number of notional sources is represented as n, with n≥1. The notional source for gun or virtual gun i is $n_i$, and the water velocity is $V_w$. The distance between gun i and hydrophone j is $r_{ij}$, and the distance between source ghost of virtual gun i and hydrophone j is $r_{ij}^g$. The reflectivity at the surface of the water is R, for example −1.

In equation (1), the reflectivity at the water surface is a constant value. However, a frequency dependent value could be used to allow for different scattering for different wavelengths. In one embodiment, the ghosts are modelled by assuming that there exists one or more virtual guns positioned above the water surface in the mirrored position of the source array guns.

In one embodiment, a sparse inversion is used to solve the set of equations in order to remove high frequency contamination in the obtained notional sources, in particular when dealing with the source array effect in the inversion. In one embodiment, the set of equations are initially solved to generate a notional source. Suitable methods for solving the set of equations initially to generate the notional source include a least squares inversion. The set of equations include a plurality of equations relating the recorded seismic data to at least one notional source. If source array effects are to be removed during inversion, the notional source is placed at each source or air gun position and is scaled by a factor proportional to the cube root of the air gun volume as described herein. A high cut filter is then applied to the resulting scaled generated notional source to extract the notional source low frequency part of the notional source containing the bubble. The notional source low frequency part is then forward modelled to create the low frequency portion of the direct arrival. This calculated low frequency portion of the direct arrival is then subtracted from the measured direct arrival in the recorded seismic data to yield a residual direct arrival containing the high frequency portion of the direct arrivals.

This high frequency portion of the direct arrivals is inverted using the same set of equations solved for the generated notional source. However, a sparse inversion is used. In one embodiment, the set of equations are solved such that the notional source high frequency part is only solved for in a narrow time window around the time at which the first pulse from the source array or airgun is recorded. As used herein, the time range for the narrow time window may be specified, for example, by the user, either as a number of samples or as a time length. The time window may be specified as small or large as desired and this designation can be adjusted to give an optimal solution to the inversion. An example of a narrow time window is a time window containing 5 or 7 samples with a sample interval of 4 ms. An alternative embodiment calculates the window size from the envelope of an initial notional source estimate. This calculation can involve inversion of direct arrival data to estimate a notional source, calculating the envelope of the notional source, calculating the peak amplitude of the envelope of the notional source, defining a percentage of the peak amplitude, e.g. 20%, and defining the window size by the peak width at 20% peak amplitude. This is equivalent to using time domain model sparseness weights to constrain the extent in time of the energy. This approach may be applied iteratively to further constrain the sparseness as required.

Alternatively, the set of equations are solved such that the high frequency component of the notional source is solved for using a sparse solution method. The iteratively re-weighted least squares method (see, "Latest Views of the Sparse Radon Transform", by Trad, D., Ulrych, T. and Sacchi, M., published in 2003 *Geophysics*, Vol 68, no 1, pp. 386-399) is used in which weights constructed from the envelope of the notional source constrain the high frequency solution. For example, given a model m, with a real time series m(t), the envelope is defined by $e(m(t)) = \sqrt{(m(t))^2 + (H(m(t)))^2}$, where H(.) is a Hilbert transform of m(t). The weights w(t) are often constructed from e(m(t)) by taking an appropriate norm, e.g. $w(t) = |e(m(t))|^p$, where p is an index which may be real or integer. The Hilbert transform is one way of performing a 90 degree phase rotation. Alternatively, Fourier transform, phase shift and, reverse Fourier transform is used to perform the 90 degree phase rotation. An alternative solution method or method of weighting could be also be used. The notional source low frequency part and the notional source high frequency part calculated using any of the steps described herein are then added together to give the actual updated notional source required to represent the source array.

Regarding group effects, the receiver array effect and the source array effect are considered. For the receiver array effect in the seismic streamers, each channel often does not represent the seismic signal received from a single point seismic sensor but the seismic signal from the summation of a plurality of point seismic sensors spaced along a length of the streamer. The individual point hydrophones or other seismic sensors in the neighbourhood of the streamer do not need to be spaced equidistantly. The receiver array effect in the overall equations representing the seismic signal is represented by the sum, which may be a weighted sum, of the individual point seismic sensors, which in turn are derived from the notional sources as previously described. The receiver array may be formed in analogue or digital. In the case of digital array forming, a frequency-wavenumber transform may be taken of the whole shot gather which may be wavenumber filtered to attenuate energy that would be aliased at the receiver group spacing. After filtering the data may be reverse frequency-wavenumber transformed back to the space-time domain. In this case, the weighted sum may include all receivers along a streamer to simulate the wavenumber filtering applied to the data. Given the linear operator representing the forward modelling, the adjoint operator is found, and the set equations is solved in a least squares fashion. Adjoint operators are well known to one of skill in the art. In other words, the inversion for the receiver array effect is automatically included in the overall inversion from the direct arrival signals to the notional sources.

In one embodiment, the effect of the receiver array is included in the set of equations for the hydrophone channels by adapting the equation as follows:

$$h_j = \frac{1}{M}\sum_{m=1}^{M} s_{jm} = \frac{1}{M}\sum_{m=1}^{M}\left[\sum_{i=1}^{n}\frac{1}{r_{ijm}}n_i\left(t-\frac{r_{ijm}}{V_w}\right) + R\sum_{i=1}^{n}\frac{1}{r_{ijm}^g}n_i\left(t-\frac{r_{ijm}^g}{V_w}\right)\right] \quad (2)$$

In equation (2), the signal $h_j$ for seismic receiver or hydrophone channel j is assumed to be the average of M point receivers having associated signals $s_{j_1}, \ldots, s_{j_M}$. A weighted sum can be used instead of an arithmetic mean. The additional index "m" is added to the variables and represents the distances between the notional sources and individual seismic receivers or hydrophone channels. While m is constant for all receiver groups in this example, it may also change if the number of sensors in the group is variable. Thus, $r_{ijm}$ refers to the distance between notional source i and the point receiver m for hydrophone channel j. Given that the position of the hydrophone group may, for example, be the centre of the receiver array group, the positions of the actual point receivers may be calculated as the distribution of the point receivers along the streamer.

Regarding the source array effect, the air guns in the seismic source array are often arranged in a plurality of strings with several air guns or seismic sources spaced along the length of each string. Considering the forward modelling of a direct arrival on an inner streamer cable from the seismic source, the waves from each air gun travel approximately in a direction along the string. Therefore interference exists among the wave fronts from each air gun. This interference is the source array effect. Alternatively, considering the forward modelling of a vertical far-field signature and assuming that all of the air guns in the source array are located at a common depth, the wave fronts from each air gun arrive at the vertical far-field location at the same time without any destructive interference.

As described above, the source array effect results from a series of airguns arranged along the sub-arrays or strings which make up the seismic source reducing the amplitude of the direct arrival signal as the frequency increases due to the time delays between the signals emitted from each airgun and the resulting interference. In one embodiment, a post processing filter applied to the notional source inverted from the direct arrivals is used to remove this source array effect. As an alternative to the post processing filter, the source array effect is included in the solution or inversion of the set of equations used to determine the notional sources from the direct arrival.

Therefore, inverting from direct arrival data to a single notional source representing the source signature, the destructive interference of the signals from each gun is encapsulated in the derived notional source (e.g. the horizontal source array effect). Before calculating a vertical far-field signature from the notional source, the notional source is corrected in a post-processing procedure to remove the source array effect. The source array effect is removed using forward modelling and generating the direct arrival far-field signature, without source ghost, resulting from a set of synthetic notional sources. The notional sources contain a spike for each air gun that is positioned at the location of the respective gun in the source array. The amplitude of each spike is directly proportional to the cube root of the gun volume. Given the resulting far-field signature, a zero phase shaping operator is created to shape between this far-field signature and a broadband spike. This shaping operator is applied to the notional source extracted from the direct arrivals. The shaping operator boosts the high frequencies in the notional source. The corrected notional source is used to calculate a vertical far-field signature.

According to an alternative embodiment for handling the source signature effect, the notional source equations are solved for a single notional wavelet. The effect of the source array is modelled in the set of equations being solved by including a model of the source array in the set of equations. The source array model is included in the set of equations by placing the single notional source, for which the set of equations is being solved, at each source or gun position and scaling the amplitude of the wavelet by a factor proportional to the cube root of the gun volume at that source position. In the case of a cluster gun including a pair of airguns, one option is to multiply the cube root of the single gun volume by two and place at the mid-position. Alternatively each airgun in the pair may be added in individually. This embodiment allows the notional source including the source array effect to be directly calculated in the solver, rather than correcting for the source array effect by applying an operator in the post-processing to account for it.

In one embodiment, the variation in the bubble period of the individual airguns is taken into account. The bubble period is known to be directly proportional to the cube root of the gun volume. This proportionality is used as a constraint incorporated into the set of equations that are solved by inversion. Therefore, a bubble segment is derived for each airgun (or airgun cluster) based on the bubble period. According to this embodiment, the unknowns are the impulse trace segment, e.g., 40 ms in length positioned at timing of main peak and the Bubble trace segments, e.g., one for each airgun or airgun cluster position. The time length for each segment relates to the bubble period. The airgun specific modelling computes the notional for each air gun or air gun cluster position as a combination of the impulse and bubble segments, i.e., the unknowns. The impulse segment is scaled by the cube root of the air gun volume, and the bubble segment is repeated based on the bubble timing and is scaled based on the bubble decay. The result is the creation of individual notional sources from the 'unknowns' to be used to model the hydrophone data as per the set of equations that are the general linear expression.

Modelling a set of n notional sources in the equations to represent each gun in the source array automatically encapsulates the source array effect into the expressions for the hydrophone channels since the arrays of individual guns are modelled. When a single notional source is used to represent the source, the source array effect is not encapsulated in the equations, and a post processing filter is applied to the calculated notional source before generating the vertical far-field.

Figure 2:
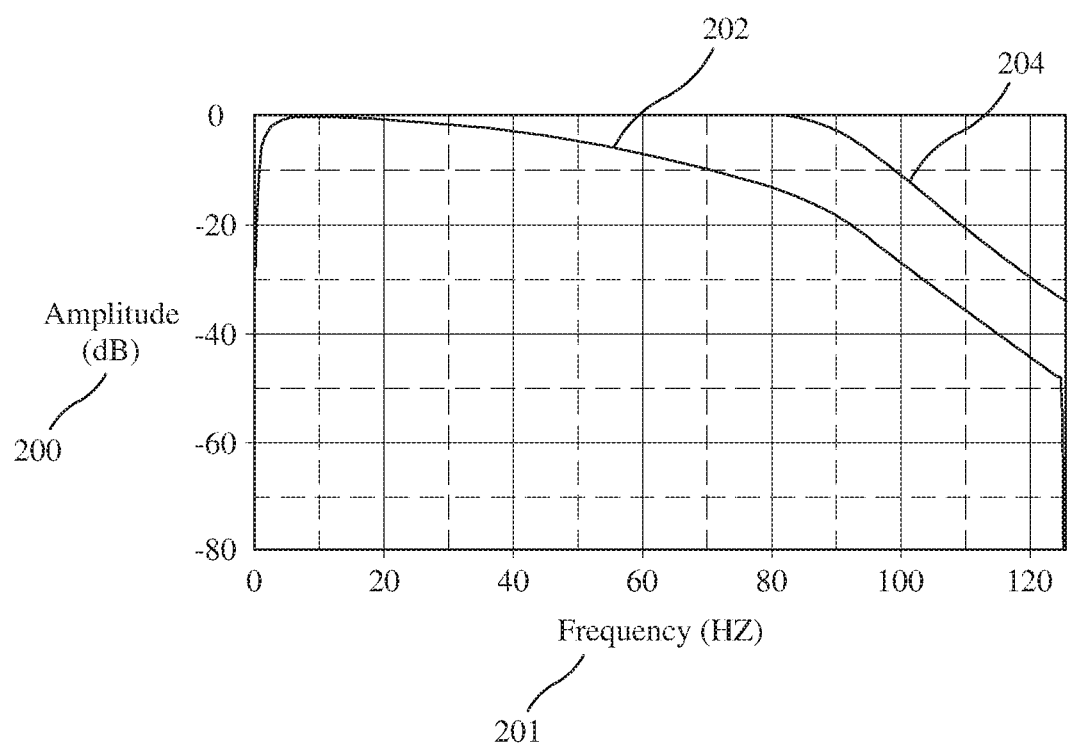
FIG. 2 is a graph illustrating the amplitude spectra of a source array function positioned horizontally away from a source array and the target amplitude spectra.

Referring to FIG. 2, a graph of amplitude (dB) 200 versus frequency (Hz) 201 illustrates the amplitude spectra of the horizontal source array effect 202 and the target to which it is shaped 204 in order to derive the filter which removes the source array effect.

As an alternative to accounting for the source array effect after or as part of the inversion, the input streamer data may be pre-processed to remove the source array effect before the linear equations are solved to derive the notional source. As required, the receiver array effect may also be compensated before, after, or during inversion for the notional source.

An overall methodology for obtaining the far-field signatures using the acquired set of seismic data and equation (1) acquires a set of seismic data from one or more receivers on a streamer in a marine seismic survey. The set of seismic data includes direct arrivals at a receiver or receiver array from a source or source array. In one embodiment, the set of seismic data is pre-processed. Suitable pre-processing includes, but is not limited to, low frequency noise removal, interference noise removal, cross-talk removal, deghosting, swell noise removal and ensuring that spherical spreading is not applied to the data. The direct arrival data from the set of seismic data derived from the seismic streamers or other sensors are inverted to the one or more notional sources that represent source array behaviour. In one embodiment, receiver array effect is included in the inversion, i.e., equation (2). In addition, the resulting updated notional sources are corrected for any source array effect. The corrected updated notional sources are then used to calculate the far-field signatures as required from the notional sources.

In one embodiment, both Ziolkowski's NFH inversion method and inversion from the direct arrival data in the seismic records to the notional sources are combined. The set of joint equations are created that relate the model, i.e., the notional sources, to both the NFH data and the direct arrival data in the seismic records using appropriate linear operators. In addition, multiplicative coefficients are specified that take into account any difference in sensor calibration between the NFH recordings and the direct arrival data in the seismic records. The calibration scalars could be found as part of an inversion. The resulting set of equations is solved using any suitable inversion method such as a least squares inversion method.

In one embodiment, direct arrival data is jointly inverted with additional data including, for example, recordings from an additional hydrophone sensor towed beneath the vessel, seismic data extracted from a well or any other estimate of a far-field. Alternatively, the inverted results from the direct arrival data are combined with the additional data.

In one embodiment, the joint inversion starts from an initial estimate of a far-field or notional source obtained from either NFH data or a modelling package such as Nucleus or Gundalf. A non-linear inversion is carried out using direct arrival data and starting from the initial estimate calculated from NFH recordings or a modelling package as described. In one embodiment, a method for the extraction of a wavelet for an initial guess in non-linear inversion, or joint inversion, is blind deconvolution.

In one embodiment, a composite method that separately calculates and combines low and high frequency far-fields is used. A set of spikes at the gun locations, e.g., those used to generate the source array filter, are used to generate a synthetic set of direct arrivals. The synthetic set of direct arrivals is scaled to the amplitude level of the actual direct arrival data, and the difference between the synthetic and measured direct arrival data is determined. This difference or residual is then inverted to calculate the equivalent notional sources that would have created that residual. These equivalent notional sources represent the low frequency component of the actual notional sources, which are then used to derive a far-field. The high frequency part of the required far-field is then generated using the synthetic notional source spikes, and a composite far-field is created by combining the low and high frequency far-fields.

Figure 3:
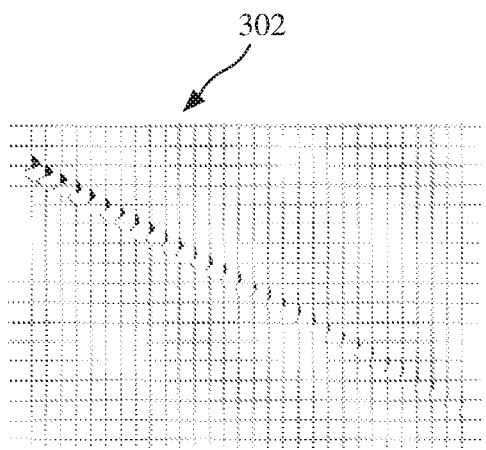
FIG. 3 is a graphical comparison of the direct arrival modeled using spikes and the direct arrival in recorded data minus the modeled direct arrival.
Figure 3:
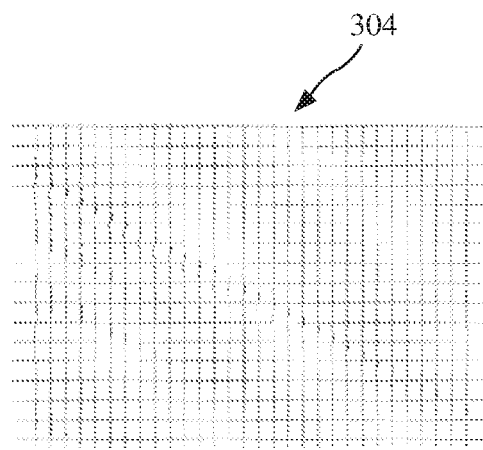

Referring to FIG. 3, the direct arrivals calculated using the set of spikes 302 are illustrated next to the residuals determined from the direct arrival in seismic data minus the modeled direct arrival 304. The source emission, including ghost, includes an initial impulse, which is similar to a spike, followed by bubble energy. The spike emitted by each airgun will have an amplitude that is a function of a number of factors, e.g. depth of the airgun, pressure of the air in the airgun and volume of the airgun. FIG. 3 at 302 illustrates the part of the direct arrival that may be approximated from a series of spikes. This is one way of estimating the high frequency component of the direct arrival. FIG. 3 at 304 shows the low frequency part of the measured direct arrival for inversion. The low frequency part is given by the measured direct arrival over all frequencies minus the high frequency simple model generated from the spikes. Overall, FIG. 3 illustrates that it is much simpler to generate a simple of model of the high frequency component and that the resulting residual representing the low frequencies is more challenging to invert.

Overall, the residual method generates a modelled set of direct arrivals from a set of synthetic notional sources containing a series of suitably scaled spikes at the gun locations in the source array. The modelled direct arrivals are scaled to the same scale as the direct arrivals recorded in the set of seismic data. The scaled modelled direct arrivals are subtracted from the recorded direct arrivals in the seismic data to give a residual set of direct arrivals containing the low frequency components. The residual direct arrivals are inverted to generate residual notional sources and vertical far-field signature, correcting for any source and receiver array effects as necessary. A high frequency portion of the vertical far-field is generated using the synthetic notional sources, and the low and high frequency portions of the vertical far-field are combined to give a composite far-field.

As described above and illustrated in FIG. 1, the expressions for the set of hydrophone equations are used to model the direct arrivals when the NFH data for the source array are available. This illustrates that the NFH data describing the source array behaviour can be used to predict accurately the direct arrivals in the recorded seismic data. The equation relating the direct arrivals to the notional sources is equation (1). The notional sources are calculated from the NFH data using the method described by Ziolkowski. In addition, the notional sources could also be derived from a modelling package where NFH data are unavailable.

In one embodiment, the direct arrivals are predicted from notional sources derived from NFH data, and the model is used as a basis for attenuating the direct arrivals that have been recorded in the seismic data. Suitable methods for attenuating the direct arrivals include, but are not limited to, direct subtraction and adaptive subtraction. In one embodiment, a global model of the direct arrivals is generated. Alternatively, a model of the direct arrivals on a shot by shot basis is determined. In one embodiment, the subtraction is applied in the (x–t) domain. Alternatively, the subtraction is applied in the tau–p domain.

In one embodiment for attenuating the direct arrivals recorded in the set of seismic data, the NFH data are acquired. The notional sources are computed using the acquired NFH data. The streamer data are received, and the direct arrivals relating to receiver positions of the streamer data are estimated using the computed notional sources. The direct arrivals are attenuated by subtracting the estimated direct arrivals from the received streamer data.

In one embodiment, an initial estimate of the direct arrivals is formed using the acquired NFH data. Then a model of the direct arrivals from the data is created using sparseness weights generated from the NFH derived direct arrivals. Therefore, the direct arrivals are estimated using the acquired NFH data, and these estimated direct arrivals are used to derive sparseness weights. The direct arrivals in the streamer data are modelled using the derived sparseness weights.

In one embodiment, the direct arrival energy is removed from the set of seismic data and the source signature is estimated. In particular, the direct arrival energy is removed in the time domain. According to this embodiment, Ziolkowski's model or an improved Ziolkowski model with non-spherical propagation in the near field in combination with other measurements in the middle field, far-field and surface field, are used to invert the source notional signature based on NFH monitoring during the shooting of sources in the marine seismic survey.

When propagated almost horizontally in water to the receivers, typically a 150 m-350 m offset in the in-line direction and a +/−500 m offset in the cross-line direction, the source signature is captured by the receivers, called direct arrival (DA), prior to its reflection on the water-bottom. The direct arrival of the source signature captured on the receivers in the streamers contains a strong source directivity, which varies with the source geometry, relative position of the receivers, and the surface reflection coefficient with large incident angle. In situations having a thin water layer, the time delay captured from the receivers between the peak of the DA and the peak of the WB can create an overlap of DA bubble with WB. As this bubble varies from receiver to receiver due to the directivity, the DA is estimated for each receiver in order to remove the DA correctly.

Figure 4:
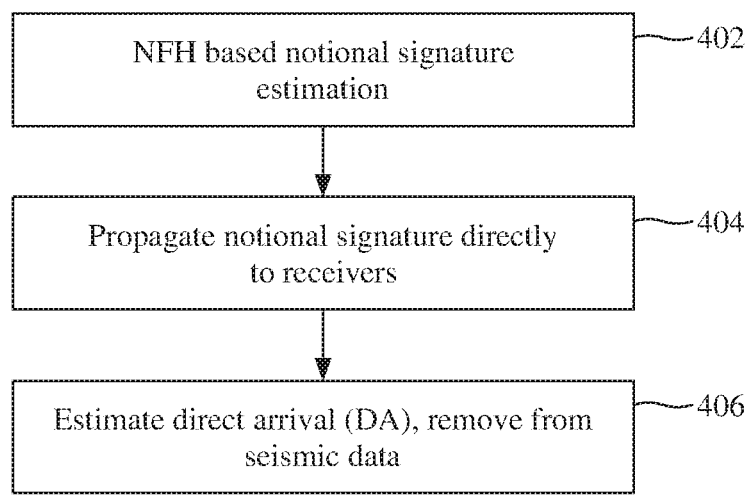
FIG. 4 is a flowchart of an embodiment of a method for removing direct arrival data from a set of seismic data.

Referring to FIG. 4, an exemplary embodiment of a method for removing direct arrival data from a set of seismic data 400 is illustrated. According to this embodiment, the pressure field generated by the seismic source using NFH monitoring. In addition, the position of each receiver relative to the source is known using a geometry monitoring method such as GPS or acoustic sounders. Additional known quantities are the water surface reflection coefficient and the response of the receivers. A NFH based notional signature is estimated 402. These estimated notional signatures are propagated to the receivers 404. The DA is estimated and removed or separated from seismic reflection data 406.

Figure 5:
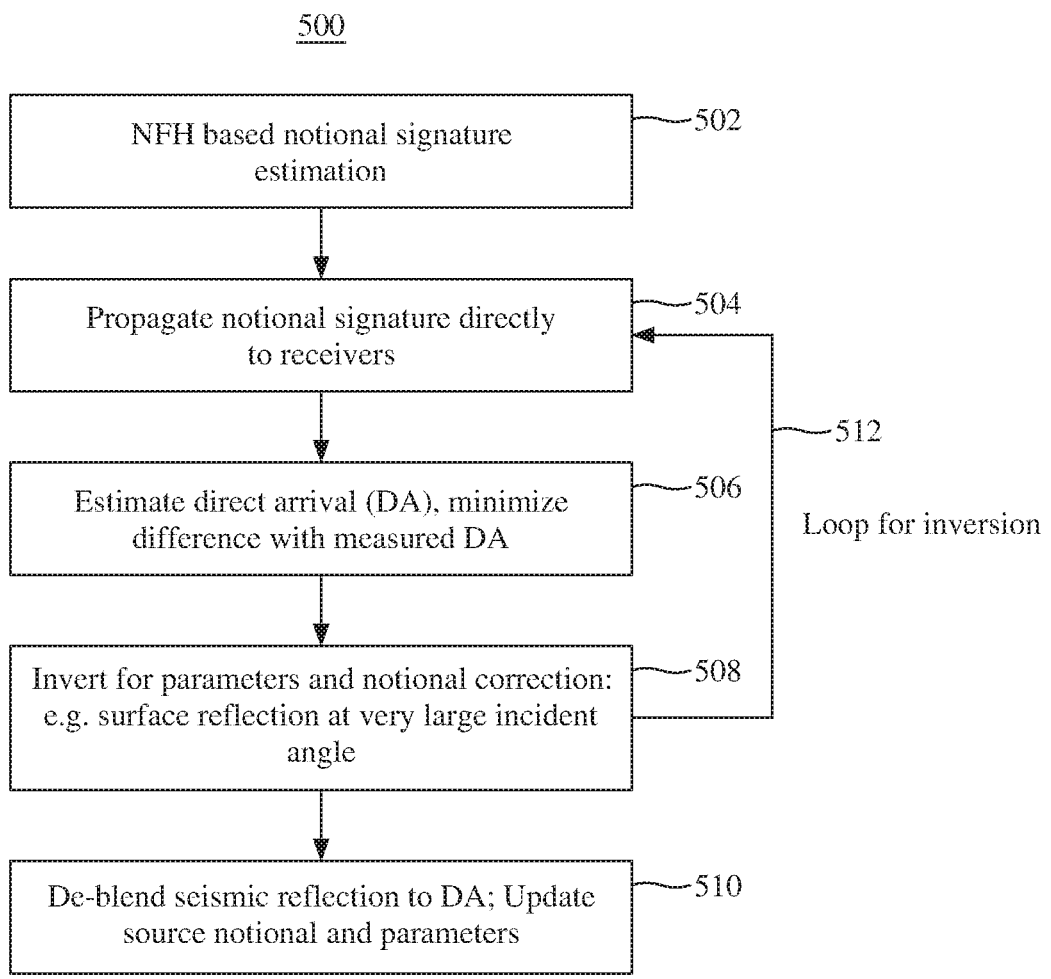
FIG. 5 is a flowchart of another embodiment of a method for removing direct arrival data from a set of seismic data.

In another embodiment, the known quantities are not available. Referring to FIG. 5, an alternative embodiment of the method for removing direct arrival from a set of seismic data 500 is illustrated. According to this embodiment, an iterative inversion procedure is used. The pressure field, all the parameters of propagation and the receiver response are updated so that the estimated direct arrival can guide the de-blending procedure to separate the DA to seismic reflection. Again, an NFH based notional signature estimated is performed 502. The estimated notional signatures are propagated directly to the seismic receivers 504. The DA is estimated, and any difference between the estimated DA and the actual measured DA is minimized 506. An inversion is performed for parameters and correction of the notional signatures 508. The steps of notional signature propagation, DA estimation and inversion are repeated iteratively 512 until the desired accuracy in the parameters and notional signatures is achieved. The DAs are separated from the seismic reflections, and the notional sources and parameters are updated 510.

Figure 6:
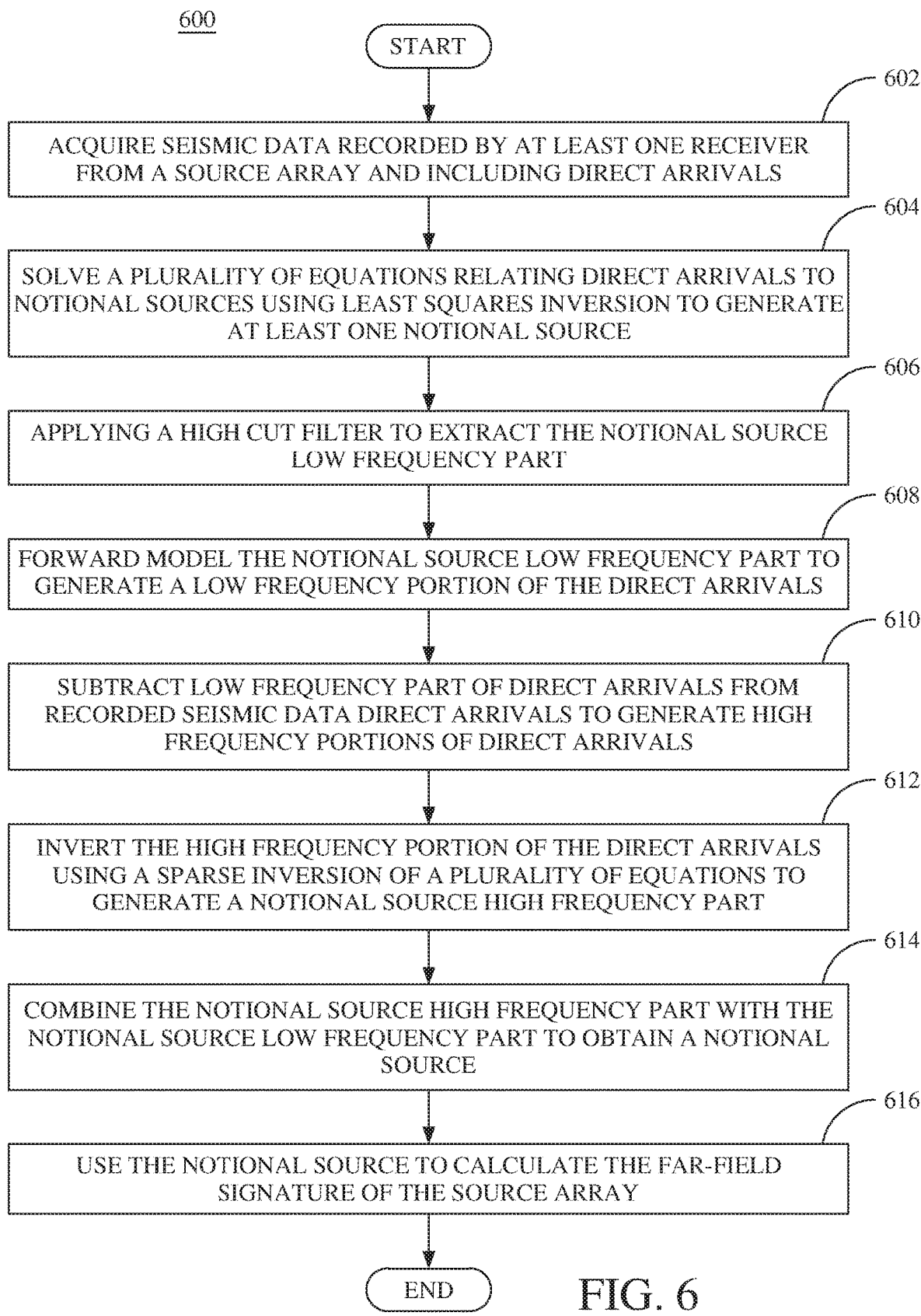
FIG. 6 is a flowchart of an embodiment of a method for estimating a far-field signature for a source array.

Referring now to FIG. 6, exemplary embodiments are directed to a method for estimating a far-field signature for a source array 600. Seismic data are acquired that were recorded by at least one receiver in a streamer and generated by the source array comprising a plurality of sources 602. The recorded seismic data includes direct arrivals. In one embodiment, a set or plurality of equations, e.g., the Ziolkowski equations, are solved using least squares inversion to generate at least one notional source 604. In one embodiment, the set of equations is a linear set of equations. The set of equations relate the direct arrivals in the recorded seismic data to notional sources corresponding to the plurality of sources in the source array.

A high cut filter is applied to the at least one notional source to extract the notional source low frequency part of the at least one notional source 606. The notional source low frequency part is forward modeled to generate a low frequency portion of the direct arrivals 608, and the low frequency portion of the direct arrivals is subtracted from the recorded seismic data direct arrivals to generate the high frequency portion of the direct arrivals 610.

The high frequency portion of the direct arrivals is inverted using sparse inversion of a plurality of equations relating the recorded seismic data to at least one notional source corresponding to the source array to derive a notional source high frequency part 612. In one embodiment, the plurality of equations is a linear system of equations. In one embodiment, inverting the high frequency portion of the direct arrivals includes solving for the notional source high frequency part in a narrow time window around a time at which a first pulse the source array was recorded. Alternatively, inverting the high frequency portion of the direct arrivals using sparse inversion involves solving for the notional source high frequency part using an iteratively re-weighted least squares inversion in which weights constructed from an envelope of the notional source constrain the notional source high frequency part.

In one embodiment, the seismic data are acquired from a receiver array comprising a plurality of individual receivers arranged on the streamer, the receiver arrays affects are accounted for in the sparse inversion. In particular, the plurality of equations includes a weighted sum of signals from the plurality of individual receivers and a spatial distribution of the individual receivers along the streamer.

In one embodiment, source array effects are accounted for in the sparse inversion. The plurality of seismic sources is located at a plurality of positions, and the plurality of equations include a model of the seismic source array containing the at least one notional source located at each one of the plurality of positions. In one embodiment, each seismic source is an air gun having a gun volume, and the model of the seismic source array includes the at least one notional source having an amplitude scaled by a factor proportional to a cube root of the gun volume at each one of the plurality of positions. In addition, the plurality of equations can also include a bubble period that is directly proportional to the cube root of the gun volume.

The notional source high frequency part is combined with the notional source low frequency part to obtain an updated notional source 614. In one embodiment, the updated notional source is corrected to remove seismic source array effects before calculating the far-field signature. The seismic source array effects represent interference among seismic signals from the plurality of seismic sources. In order to correct the updated notional source, the updated notional source is forward modeled to generate a direct arrival far-field signature resulting from the updated notional source. The direct arrival contains a spike for each seismic source in the seismic source array. Each spike has an amplitude. A shaping operator is created that modifies the direct arrival to a broadband spike. This shaping operator is applied to the updated notional source to create a corrected updated notional source. In one embodiment, each seismic source is an air gun having a gun volume, and each spike amplitude is directly proportional to the cube root of the gun volume.

The updated notional source is used to calculate the far-field signature of the source array 616. The updated notional source is corrected to remove the source array effects, following which is may be used to calculate a far-field signature.

Instead of calculating a farfield signature which is used to derive a designature operator, it is also possible to apply designature using an inversion. This approach may be applied to every trace, wherein an inversion is constructed to find a trace such that when it is convolved with the farfield signature, the input data is constructed in a least squares (or other norm) sense. This inversion approach may apply source signature correction without directly calculating a farfield signature.

Note that the operation of calculating a farfield signature from a notional source is a linear operation. As such, it may be preferable to derive a farfield signature directly from the direct arrival data instead of first deriving a notional source and then deriving a farfield signature from the notional source.

Figure 7:
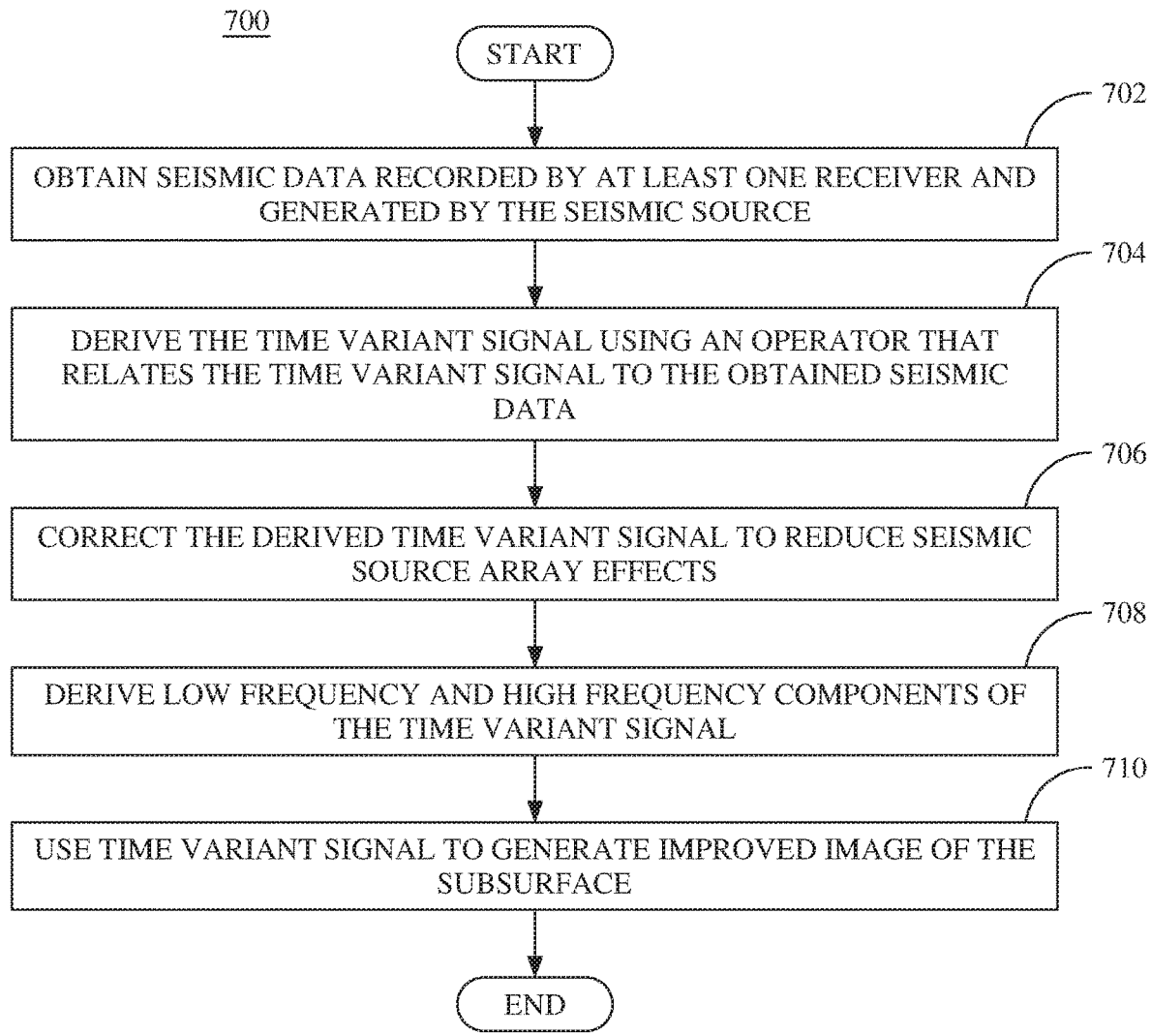
FIG. 7 is a flowchart of another embodiment of a method for estimating a time variant signal representing a source array.

Referring to FIG. 7, embodiments are directed to a method for estimating a time variant signal representing a seismic source 700. Suitable seismic sources include a source array containing a plurality of seismic sources. In one embodiment, the plurality of seismic sources are located at a plurality of positions. Suitable seismic sources include air guns having a gun volume. Seismic data recorded by at least one receiver and generated by the seismic source are obtained 702. The recorded seismic data include direct arrivals. These direct arrivals can include a ghost reflection at the air-water interface. In one embodiment, the at least one receiver is a receiver array containing a plurality of individual receivers. Therefore, the seismic data are obtained from this the receiver array.

The time variant signal is derived using an operator that relates the time variant signal to the obtained seismic data 704. As used herein operator refers to any suitable function or relation that relates the seismic data to the model including. Suitable operators include, linear operators (for example a convolution) and the plurality of equations as described herein. When the seismic source is a seismic source array, the operator includes a model of the seismic source array and contains at least one notional source. In one embodiment, the operator is solved for a single notional source and subsequently corrected for source array effects. Alternatively, at least one notion source is located at each one of the plurality of positions of the seismic sources in the seismic source array. In one embodiment, this model of the seismic source array includes at least one notional source having an amplitude scaled by a factor proportional to a cube root of the gun volume at each one of the plurality of positions.

When the seismic data are obtained from a plurality of receivers in a seismic receiver array, the operator includes a sum of signals from the plurality of individual receivers and a spatial distribution of the individual receivers in the seismic receiver array. In one embodiment, the operator is defined so as to relate the obtained seismic data to a model represented by a series of spikes (e.g. a dirac function defined in the frequency domain by a complex exponential of form $A \exp(2\pi i f t)$ where f is frequency, t is time shift, and A is the amplitude of the spike). In other words, it is assumed that each gun signature is represented by a high frequency impulse response. In one embodiment, the operator defines a linear problem that is constrained using sparseness weights. Examples of linear problems solved with sparseness weights are described in "Latest Views of the Sparse Radon Transform", by Trad, D., Ulrych, T. and Sacchi, M., published in 2003 *Geophysics*, Vol 68, no 1, pp. 386-399". In one embodiment, the sparseness weights restrict the time variant signal to a time window as described herein. In one embodiment, the sparseness weights are derived from the time variant signal in the plurality of equations representing the problem.

In general, a mathematical problem is solved to find a time varying signal representing the seismic source behavior. As used herein, a time varying signal is a single or multivalued mathematical function where time is the independent variable. Suitable time variant signals include, but are not limited to, a notional source and a farfield signature. When deriving the time variant signal, the operator is constrained such that the time variant signal is sparse in time. Suitable methods for constraining the operator such that the time variant signal is sparse in time are known and available in the art. In one embodiment when the seismic source is a seismic source array, the derived time variant signal is corrected to reduce seismic source array effects 706. In one embodiment, this correction can be carried out by applying a post processing filter representing the source array effect. In one embodiment, low frequency, i.e., non-impulsive, and high frequency, i.e., impulsive, components of the time variant signal are derived 708, preferably separately. The components of the time variant signal may be derived by solving the plurality of equations representing the physical problem. The derived time variant signals can then be used to generate an improved image of the subsurface and the far field signatures in the subsurface 710. This can be displayed to a user or saved for future use or additional processing.

Figure 8:
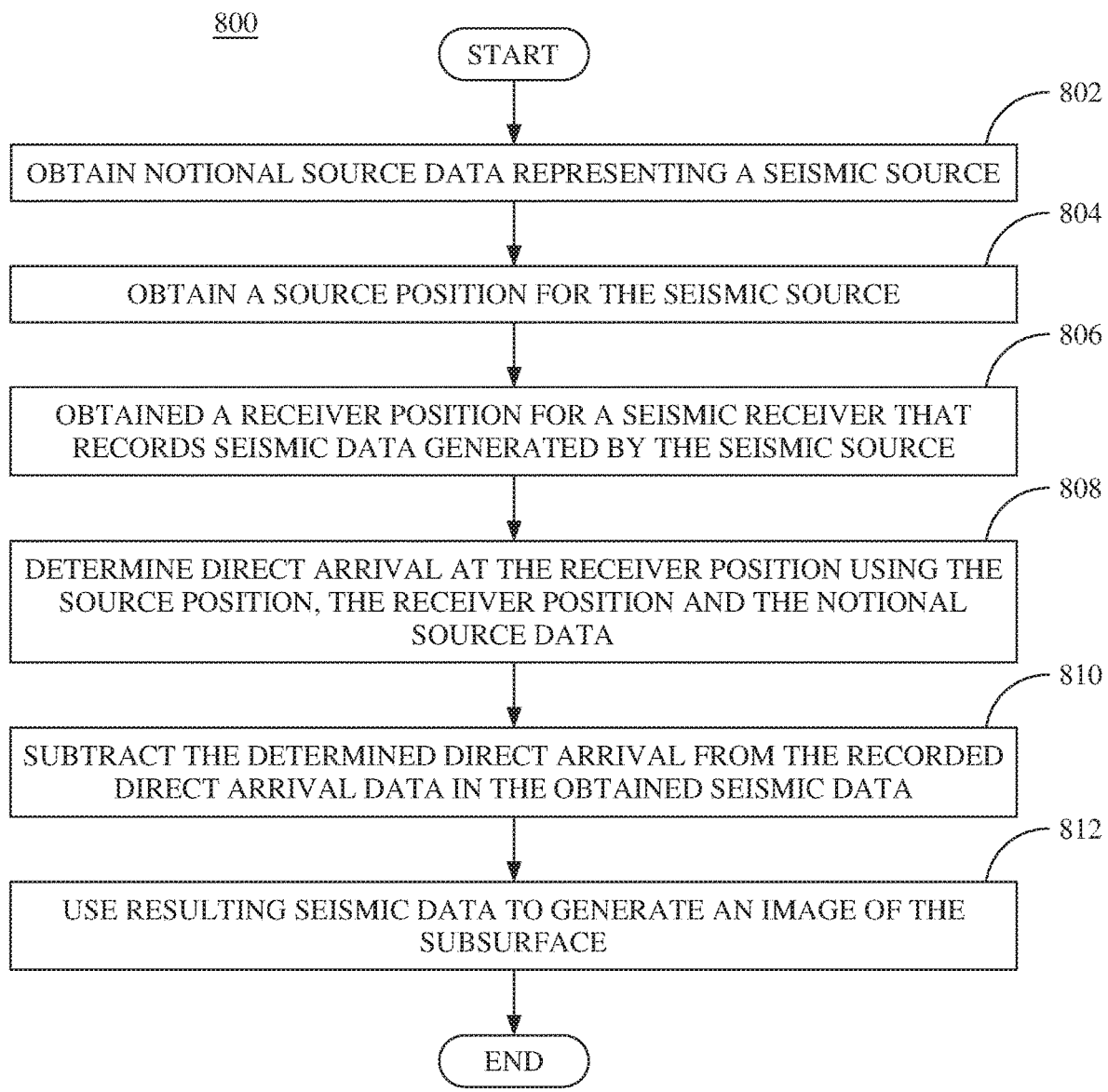
FIG. 8 is a flowchart of an embodiment of a method for estimating the direct arrival in the seismic data from the notional sources in a source array.

Referring to FIG. 8, embodiments are directed to a method for determining direct arrival energy 800. Notional source data representing a seismic source are obtained 802.

In one embodiment, the notional source data are derived from at least one nearfield hydrophone measurement and physical modelling. A source position for the seismic source is obtained 804, and a receiver position for a seismic receiver that records seismic data generated by the seismic source is obtained 806. Suitable seismic receivers include, but are not limited to, a point receiver and a seismic receiver array containing a plurality of point receivers. When the seismic receiver is a seismic receiver array, the recordings of the plurality of point receivers are combined.

A direct arrival is determined at the receiver position using the source position, the receiver position, and the notional source data 808. For example, the direct arrival is calculated using the plurality of equations or operator that relates the seismic data to the seismic source. In one embodiment, the determined direct arrival is subtracted from the direct arrival data in the obtained/acquired seismic data 810. The resulting seismic data with the determined direct arrivals removed are used to generate an improved image of the subsurface 812. This can be displayed to a user or saved for future use or additional processing.

Figure 9:
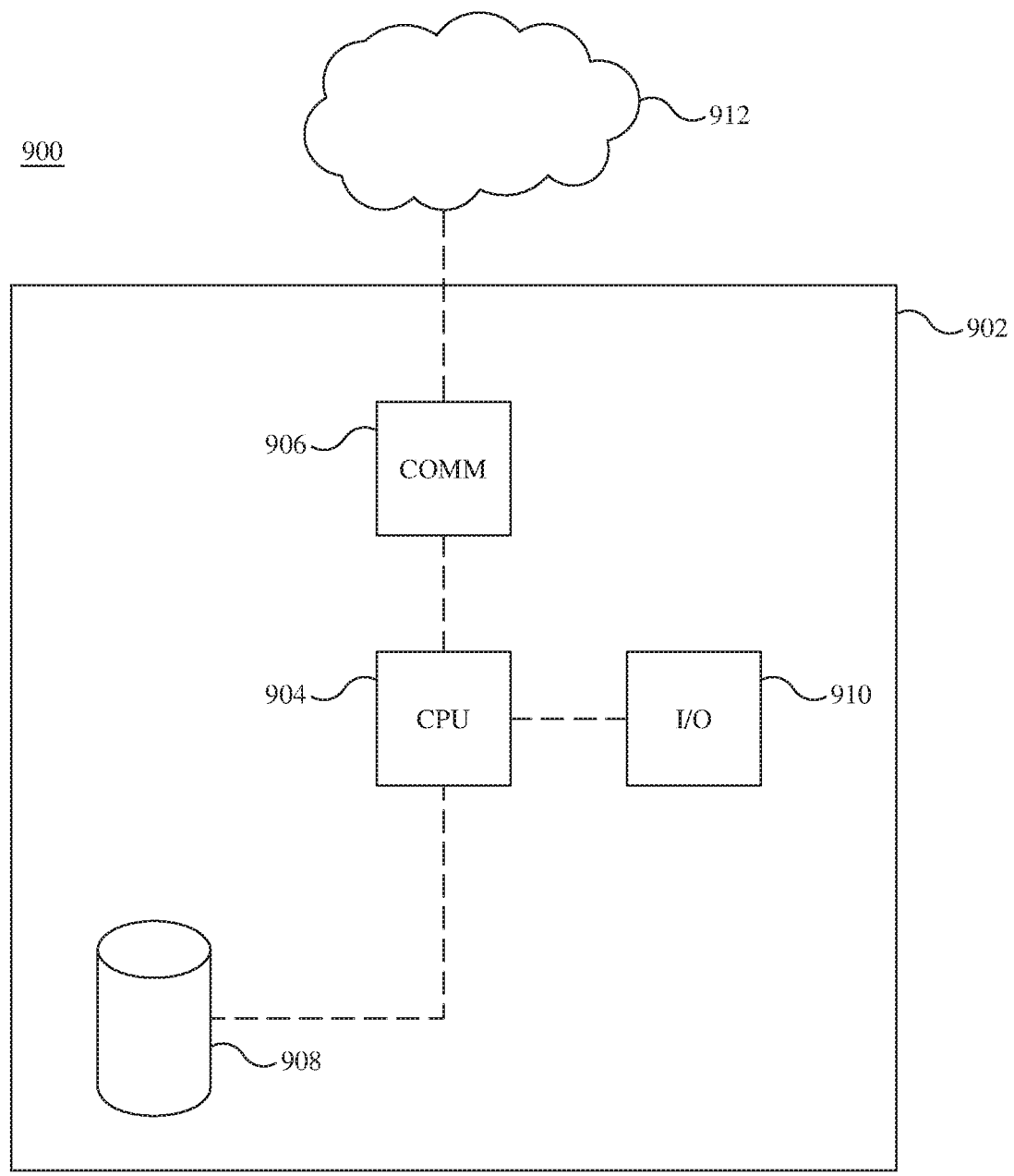
FIG. 9 is a schematic representation of an embodiment of a computing system for use in executing a method for estimating a far-field signature for a source array.

Referring now to FIG. 9, exemplary embodiments are directed to a computing system 900 for estimating a far-field signature for a source array. In one embodiment, a computing device for performing the calculations as set forth in the above-described embodiments may be any type of computing device capable of obtaining, processing and communicating acquired seismic data from marine surveys. The computing system 900 includes a computer or server 902 having one or more central processing units 904 in communication with a communication module 906, one or more input/output devices 910 and at least one storage device 908.

The communication module is used to obtain seismic data, include direct arrivals, recorded at a receiver or receiver array from signals generate at a seismic source or seismic source array. These seismic data can be obtained, for example, through the input/output devices. The acquired seismic data containing the direct arrivals are stored in the storage device. The input/output device can also be used to communicate or display the notional sources or far-field signature and any images or models generated for the subsurface or seismic survey, for example, to a user of the computing system.

The processor is in communication with the communication module and storage device and is configured invert a high frequency portion of the direct arrivals using sparse inversion of a plurality of equations relating the recorded seismic data to at least one notional source corresponding to the source array to derive a notional source high frequency part, combine the notional source high frequency part with a notional source low frequency part to obtain an updated notional source and use the updated notional source to calculate the far-field signature of the source array. In one embodiment, the processor is configured to derive the time variant signal using an operator that relates the time variant signal to the recorded seismic data, wherein the operator is constrained such that the time variant signal is sparse in time.

Suitable embodiments for the various components of the computing system are known to those of ordinary skill in the art, and this description includes all known and future variants of these types of devices. The communication module provides for communication with other computing systems, databases and data acquisition systems across one or more local or wide area networks 912. This includes both wired and wireless communication. Suitable input/output devices include keyboards, point and click type devices, audio devices, optical media devices and visual displays.

Suitable storage devices include magnetic media such as a hard disk drive (HDD), solid state memory devices including flash drives, ROM and RAM and optical media. The storage device can contain data as well as software code for executing the functions of the computing system and the functions in accordance with the methods described herein. Therefore, the computing system 900 can be used to implement the methods described above associated with estimating a far-field signature for a source array. Hardware, firmware, software or a combination thereof may be used to perform the various steps and operations described herein.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for estimating a far-field signature for a source array in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

The disclosed exemplary embodiments provide a computing device, software and method for method for estimating a far-field signature for a source array. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for determining a direct arrival energy, the method comprising:
    obtaining notional source data representing a seismic source, from far-field seismic data;
    obtaining a source position for the seismic source;
    obtaining a receiver position for a seismic receiver that records seismic data due to energy emitted by the seismic source;
    determining a direct arrival energy at the receiver position using the source position, the receiver position, and the notional source data,
    subtracting the direct arrival energy determined using the source position, the receiver position, and the notional source data from the seismic data; and
    using the seismic data remaining after subtracting the direct arrival energy to generate an image of the subsurface.

2. The method of claim 1, wherein the seismic receiver comprises a receiver array comprising a plurality of point receivers, wherein the receiver array combines recordings from the plurality of point receivers.

3. The method of claim 1, wherein the seismic receiver comprises a point receiver.

4. The method of claim 1, wherein the far-field seismic data is acquired with receivers at more than 10 meters from the seismic source.

5. The method of claim 1, wherein the far-field seismic data is streamer data.

6. The method of claim 1, wherein the far-field seismic data is estimated direct arrival data portion of the seismic data.

7. The method of claim 1, wherein the notional source data includes a notional source for the seismic source.

8. The method of claim 1, wherein the notional source data includes notional sources for each gun string of the seismic source.

9. The method of claim 1, wherein the notional source data includes notional sources for each air gun of the seismic source.

10. The method of claim 1, wherein the seismic source includes air guns placed at more than one depth.

11. The method of claim 1, wherein the seismic source includes one or more vibrators, pingers, sparkers, boomers or vaporchoc.

12. The method of claim 1, wherein the determining takes into consideration time shifts and/or spherical spreading.

* * * * *